(No Model.)
H. B. HARTER.
VETERINARY SURGICAL INSTRUMENT.
No. 415,715. Patented Nov. 26, 1889.
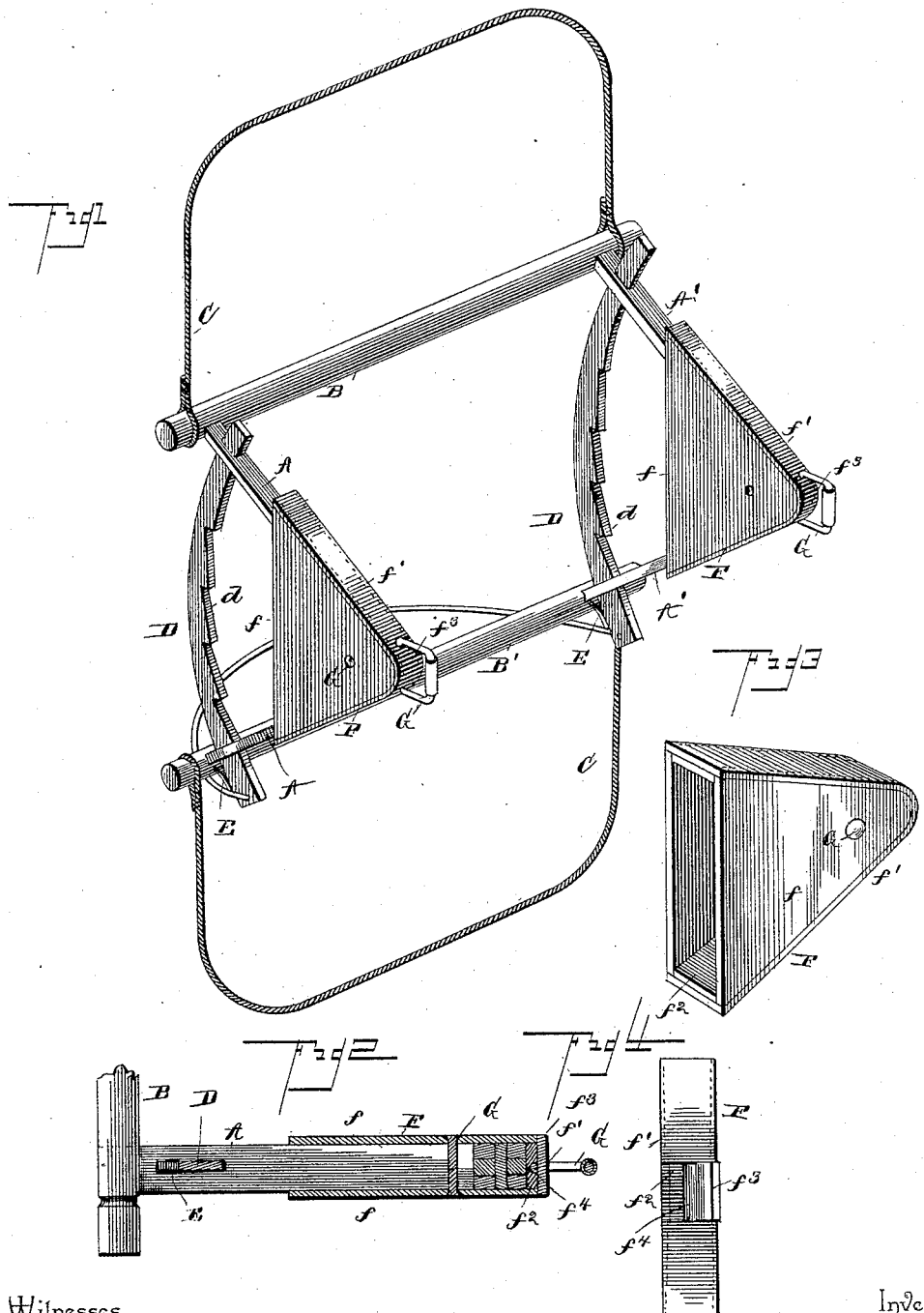
Witnesses
John Imirie
H. F. Riley
By his Attorneys,
C. A. Snow & Co.
Inventor
Hiram B. Harter

UNITED STATES PATENT OFFICE.

HIRAM B. HARTER, OF ONEIDA, KANSAS.

VETERINARY SURGICAL INSTRUMENT.

SPECIFICATION forming part of Letters Patent No. 415,715, dated November 26, 1889.

Application filed August 30, 1889. Serial No. 322,402. (No model.)

*To all whom it may concern:*

Be it known that I, HIRAM B. HARTER, a citizen of the United States, residing at Oneida, in the county of Nemaha and State of Kansas, have invented a new and useful Veterinary Surgical Instrument, of which the following is a specification.

The invention relates to improvements in veterinary surgical instruments.

Heretofore instruments for forcing open the mouths of animals have been constructed, but in their operation the hinged bars have pinched the mouth of the animal, causing no little annoyance.

The object of the present invention is to obviate the above objection and provide a guard which shall be simple and cheap in its construction and adapted to be readily applied to mouth-openers of ordinary construction.

A further object of the invention is to provide means for separating the hinged bars.

The invention consists in the construction and novel combination and arrangement of parts hereinafter fully described, illustrated in the accompanying drawings, and pointed out in the claims hereto appended.

In the drawings, Figure 1 is a perspective view of an instrument provided with the improvements. Fig. 2 is a horizontal sectional view. Fig. 3 is a detail perspective view of the guard. Fig. 4 is an end view of the guard, the tongue or flap which secures the loop in place being raised.

Referring to the accompanying drawings, A and A' designate two pairs of bars, each pair being hinged together and secured to two similar bit-bars B and B', which extend beyond the hinged bars A and A', and are provided with bails of cord, wire, or chains C, that enable the bit-bars to be readily separated.

In order to keep the bars A and A' separated, I secure to each of the bars A a notched plate D, which passes through a slot in the opposite bar A', and by means of a spring E is held against a catch in the slot, which catch is made to fit the notches $d$ of the plate D.

The hinged bars A and A' are prevented pinching the neck of an animal by a leather guard F, which is approximately V-shaped and is secured in place by a rivet G, that passes through its sides $f$ and between the hinged bars. The guards F consist of the two sides $f$ and the strips or edge-pieces $f'$ $f^2$, that are secured by stitching around the sides and back of the pieces $f$, and form, with the latter, a casing to surround the inner ends of the hinged bars and prevent them closing on the animal's neck. At the back of the guard F, which is constructed sufficiently large to permit the necessary separation of the bars A and A', the strip $f'$ is cut to form a tongue or flap $f^3$, and the inner strip of $f^2$, which strengthens the guard, has a channel or groove $f^4$ to receive a loop G, to which the strap is attached which secures the instrument to the animal's head. The flap or tongue is stitched back in place and forms a secure and convenient means of attaching the loop G.

From the foregoing description and the accompanying drawings the construction, operation, and advantages of the invention will readily be understood.

What I claim is—

1. The combination, with the hinged bars, the bit-bars connecting the hinged bars and projecting beyond the same, of the bails secured to the ends of the bit-bars, whereby the latter may be readily separated, substantially as described.

2. The combination, in a veterinary instrument, of the hinged bars A and A' and the guards F, surrounding their inner ends, substantially as and for the purpose described.

3. The combination, in a veterinary instrument, of the hinged bars, the V-shaped guard surrounding the inner end of the bars, the rivet passing through the sides of the guards and between the bars, and the loop secured to the back of the guard, substantially as described.

In testimony that I claim the foregoing as my own I have hereto affixed my signature in presence of two witnesses.

HIRAM B. HARTER.

Witnesses:
GEORGE N. HARTER,
F. E. WIKOFF.